US009704030B2

United States Patent
Osamura et al.

(10) Patent No.: US 9,704,030 B2
(45) Date of Patent: Jul. 11, 2017

(54) FLESH COLOR DETECTION CONDITION DETERMINING APPARATUS, AND FLESH COLOR DETECTION CONDITION DETERMINING METHOD

(71) Applicant: FUJITSU LIMITED, Kawasaki-shi, Kanagawa (JP)

(72) Inventors: Kazuki Osamura, Kawasaki (JP); Taichi Murase, Kawasaki (JP); Takahiro Matsuda, Isehara (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/615,669

(22) Filed: Feb. 6, 2015

(65) Prior Publication Data
US 2015/0269748 A1    Sep. 24, 2015

(30) Foreign Application Priority Data

Mar. 24, 2014    (JP) ................................ 2014-060683

(51) Int. Cl.
G06K 9/00    (2006.01)
G06K 9/46    (2006.01)
G06T 7/90    (2017.01)

(52) U.S. Cl.
CPC ..... G06K 9/00375 (2013.01); G06K 9/00389 (2013.01); G06K 9/4652 (2013.01); G06T 7/90 (2017.01)

(58) Field of Classification Search
None
See application file for complete search history.

(56) References Cited

U.S. PATENT DOCUMENTS

2009/0102788 A1*    4/2009    Nishida ................... G06F 3/014
                                                        345/158
2010/0150442 A1*    6/2010    Kim ....................... G06K 9/4652
                                                        382/167
(Continued)

FOREIGN PATENT DOCUMENTS

JP           2005-242582        9/2005
JP    WO 2012124686 A1 *    9/2012    ........... G06T 7/0042
(Continued)

OTHER PUBLICATIONS

J.A. Ojo et al., "Illumination Invariant Face Detection Using Hybrid Skin Segmentation Method", European Journal of Computer Science and Information Technology, vol. 1, No. 4, pp. 1-9, Dec. 1, 2013.
Son Lam Phung et al.,"Adaptive Skin Segmentation in Color Images", Proceedings of the 2003 International Conference on Multimedia and EXPO, vol. 3, pp. 173-176, Jul. 6, 2003, IEEE Operations Center, US. XP010651181.
(Continued)

Primary Examiner — Bernard Krasnic
(74) Attorney, Agent, or Firm — Fujitsu Patent Center (57)    ABSTRACT

A flesh color detection condition determining apparatus includes a flesh color region detecting unit which detects, from an image on which a subject having a flesh color is represented, a group of pixels having colors included in a range of colors corresponding to the flesh color, as a flesh color region; an evaluation value calculating unit which calculates an evaluation value representing a size of the flesh color region; a condition alteration unit which narrows the range of colors until a difference between the evaluation value and a reference value representing a size of the subject on the image is not included in a predetermined allowable range; and a setting unit which sets a narrowest range of colors as a flesh color detection condition, among a range of colors satisfying that the difference is included in the predetermined allowable range.

7 Claims, 7 Drawing Sheets

(56) References Cited

U.S. PATENT DOCUMENTS

| | | | | |
|---|---|---|---|---|
| 2010/0160049 A1* | 6/2010 | Oku | ............... | A63F 13/10 463/43 |
| 2011/0142338 A1* | 6/2011 | Do | ............... | G06K 9/00362 382/165 |
| 2014/0003665 A1* | 1/2014 | Hoshino | ............... | G06T 7/0042 382/103 |
| 2014/0147035 A1* | 5/2014 | Ding | ............... | G06F 3/017 382/164 |

FOREIGN PATENT DOCUMENTS

| | | | | |
|---|---|---|---|---|
| JP | 2014-225145 | * | 12/2014 | ............. G06F 3/023 |
| KR | WO 2010041836 A2 | * | 4/2010 | ......... G06K 9/00362 |
| WO | 2010/041836 A2 | | 4/2010 | |

OTHER PUBLICATIONS

Abhishek Choudhury et al., "A Novel Skin Tone Detection Algorithm for Contraband Images Analysis", Third International Workshop on Systematic Approaches to Digital Forensic Engineering, May 22, 2008, pp. 3-9, IEEE, USA. XP031274084.

Jingwen Dai et al., "Making any planar surface into a touch-sensitive display by a mere projector and camera", Computer Vision and Pattern Recognition Workshops (CVPRW), Jun. 16, 2012, pp. 35-42, IEEE Computer Society Conference on. XP032206819.

Julien Doublet et al., "Hand detection for contactless biometrics identification", COGIS 2006—Cognitive Systems with Interactive Sensors, Mar. 19, 2013. [Retrieved Sep. 9, 2015: URL: https://hal.archives-ouvertes.fr/hal-0090702.

EESR—The Extended European Search Report of European Patent Application No. 15154825.2 dated Oct. 5, 2015.

* cited by examiner

| GESTURE | OPERATION |
|---|---|
| RIGHTWARD MOVEMENT | RIGHTWARD SCROLL |
| LEFTWARD MOVEMENT | LEFTWARD SCROLL |
| UPWARD MOVEMENT | UPWARD SCROLL |
| DOWNWARD MOVEMENT | DOWNWARD SCROLL |

700

FLESH COLOR DETECTION CONDITION DETERMINING APPARATUS, AND FLESH COLOR DETECTION CONDITION DETERMINING METHOD

CROSS-REFERENCE TO RELATED APPLICATION

This application is based upon and claims the benefit of priority of the prior Japanese Patent Application No. 2014-060683, filed on Mar. 24, 2014, and the entire contents of which are incorporated herein by reference.

FIELD

The embodiments discussed herein are related to a flesh color detection condition determining apparatus, a flesh color detection condition determining method, and a flesh color detection condition determining computer program for determining a flesh color detection condition for use in detecting a flesh color region on an image.

BACKGROUND

Conventionally, a technique for detecting a flesh color region on an image in order to detect a person or a specific part of a person represented on the image has been utilized. However, unless a condition for detecting a flesh color region (hereinafter referred to as a flesh color detection condition) is appropriate, a region, in which an object other than a human body is represented that has a color close to a flesh color, may be erroneously detected, or conversely, a part of a human body to be detected may not be detected. In view of the above, there is proposed a technique, in which a flesh color model utilized in detecting a flesh color region is updated, every time a face is detected, and a flesh color model suitable for each color environment is automatically determined in a variety of illumination/camera conditions (see e.g. Japanese Laid-open Patent Publication No. 2005-242582).

SUMMARY

When a flesh color detection condition is not appropriate, and a region, in which a subject having a flesh color to be detected is represented, is not accurately detected, the detection result may adversely affect a process based on a detected subject region. In view of the above, it is preferable to obtain a flesh color detection condition capable of more accurately detecting a region in which a subject having a flesh color is represented from an image.

According to an embodiment, a flesh color detection condition determining apparatus is provided. The flesh color detection condition determining apparatus includes a flesh color region detecting unit which detects, from an image on which a subject having a flesh color is represented, a group of pixels having colors included in a range of colors corresponding to the flesh color, as a flesh color region; an evaluation value calculating unit which calculates an evaluation value representing a size of the flesh color region; a condition alteration unit which narrows the range of colors until a difference between the evaluation value and a reference value representing a size of the subject on the image is not included in a predetermined allowable range; and a setting unit which sets a narrowest range of colors as a flesh color detection condition, among a range of colors satisfying that the difference is included in the predetermined allowable range.

The object and advantages of the invention will be realized and attained, using the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Figure 1A:
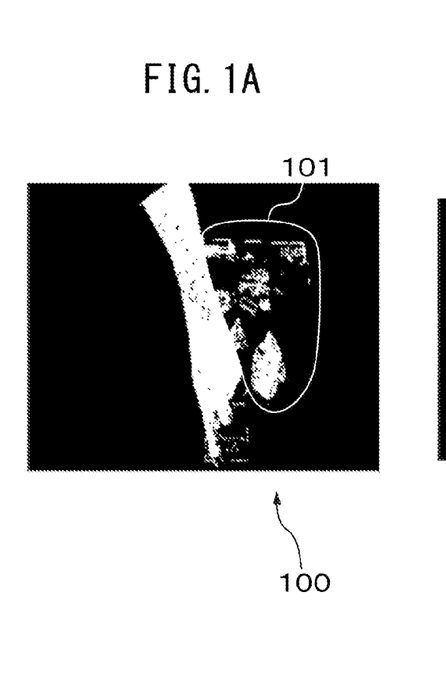
FIG. 1A is a diagram illustrating a flesh color region detected from an image, when the range of colors defined by a flesh color detection condition is too wide.
Figure 1B:
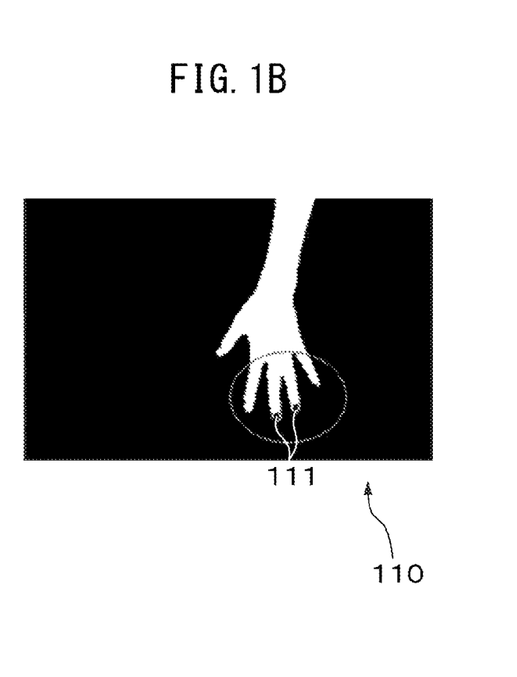
FIG. 1B is a diagram illustrating a flesh color region detected from an image, when the range of colors defined by a flesh color detection condition is too narrow.

In the following, a flesh color detection condition determining apparatus is described referring to the drawings. First of all, a flesh color region detected from an image, when the flesh color detection condition is inappropriate, is described. FIG. 1A is a diagram illustrating a flesh color region detected from an image in which a user's hand is represented, when the range of colors defined by the flesh color detection condition is too wide. FIG. 1B is a diagram illustrating a flesh color region detected from an image in which a user's hand is represented, when the range of colors defined by the flesh color detection condition is too narrow. In an image 100 illustrated in FIG. 1A, a white region is a detected flesh color region. In this example, the flesh color detection condition is too loose, (i.e., the range of colors determined to be a flesh color is too wide), and therefore a region 101, in which an object other than the hand is represented that has a color close to the flesh color, is also detected as a flesh color region.

On the other hand, in the example illustrated in FIG. 1B, the flesh color detection condition is too severe in an image 110, (i.e., the range of colors determined to be a flesh color is too narrow), and therefore a region 111 corresponding to the nails is excluded from the flesh color region.

As described above, when the flesh color detection condition is inappropriate, a flesh color region detected from an image fails to accurately represent the size, the shape, and the position or the like of a subject to be detected. In view of the above, the flesh color detection condition determining apparatus detects a group of pixels having colors included in the range of colors provisionally defined by a flesh color detection condition as a flesh color region from a sample image in which a subject having a flesh color is represented, and calculates an evaluation value representing the size of the flesh color region. The flesh color detection condition determining apparatus narrows the range of colors defined by the provisional flesh color detection condition until the difference between the evaluation value and a reference value representing the size of a subject having a flesh color on the sample image is not included in a predetermined allowable range. The flesh color detection condition determining apparatus sets the narrowest range of colors as a flesh color detection condition, among the range of colors satisfying that the difference is included in the predetermined allowable range, so as to obtain a flesh color detection condition that enables to accurately distinguish a region in which a subject having a flesh color is represented from other regions.

In the following, a flesh color detection condition determining apparatus according to one embodiment is described using a gesture recognition apparatus as an example which detects, utilizing the flesh color detection condition determining apparatus, a user's hand as a subject having a flesh color from an image, and recognizes a gesture, based on the detected user's hand.

Figure 2:
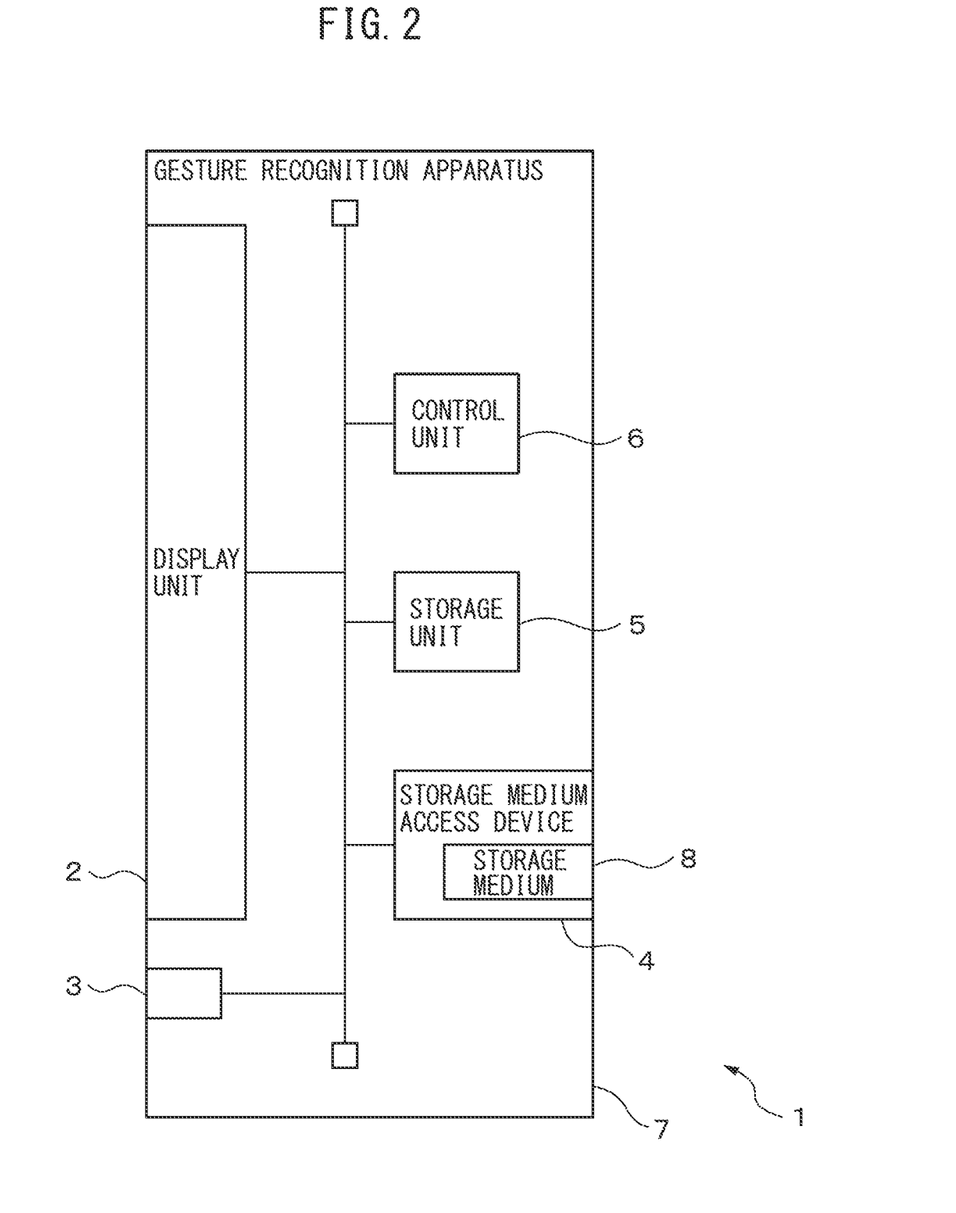
FIG. 2 is a hardware configuration diagram of a gesture recognition apparatus in which a flesh color detection condition determining apparatus is incorporated.

FIG. 2 is a hardware configuration diagram of a gesture recognition apparatus in which a flesh color detection condition determining apparatus is incorporated. The gesture recognition apparatus 1 includes a display unit 2, an imaging unit 3, a storage medium access device 4, a storage unit 5, and a control unit 6. The display unit 2, the imaging unit 3, the storage medium access device 4, the storage unit 5, and the control unit 6 are disposed in a housing 7. The gesture recognition apparatus 1 may be, for example, a portable terminal such as a mobile phone, a personal digital assistant, and a tablet computer, or a stationary computer. Further, the gesture recognition apparatus 1 may include a communication interface circuit (not illustrated) for connecting the gesture recognition apparatus 1 to other device. Note that FIG. 2 is a diagram for describing the components included in the gesture recognition apparatus 1, and is not a diagram representing an actual arrangement of each of the components of the gesture recognition apparatus 1.

The gesture recognition apparatus 1 specifies a user's hand by detecting a flesh color region from each of the images of the user's hand, which is periodically photographed by the imaging unit 3, and recognizes a gesture performed by the user by tracking the position, the shape, or the movement of the hand. The gesture recognition apparatus 1 executes a process corresponding to an operation in response to a gesture performed by the user. Hereby, even when the user is unable to directly touch the gesture recognition apparatus 1, for example, for the reason that the user's hand is wet, the gesture recognition apparatus 1 enables the user to perform an intended operation with respect to the gesture recognition apparatus 1.

The display unit 2 includes, for example, a liquid crystal display or an organic electroluminescence display, and the display screen of the display unit 2 is disposed so as to face the user who opposes the front of the housing 7. The display unit 2 displays various kinds of information to the user. The display unit 2 may also include a touch panel display. In this case, the display unit 2 displays, for example, a variety of icons or operation buttons corresponding to a control signal from the control unit 6. When the user touches the position of a displayed icon or operation button, the display unit 2 generates an operation signal corresponding to the position, and outputs the operation signal to the control unit 6.

The imaging unit 3, for example, includes an image sensor having solid-state imaging elements disposed in a two-dimensional array, and an imaging optical system which forms an image of a subject on the image sensor.

The imaging unit 3 photographs the user's hand at a predetermined cycle to generate an image in which the user's hand is represented at each cycle. In the embodiment, an image to be generated is a color image of which value of each pixel is represented by an RGB color system. The imaging unit 3 outputs a generated image to the control unit 6 every time the image is generated. The cycle is, for example, 33 msec.

The storage medium access device 4 is a device for accessing a storage medium 8 such as a magnetic disk or a semiconductor memory card, for example. The storage medium access device 4 reads in a computer program that is stored in the storage medium 8 and executed on the control unit 6, and passes the computer program to the control unit 6, for example. Further, as described later, when the control unit 6 executes a computer program which realizes the function as the flesh color detection condition determining apparatus, the storage medium access device 4 may read in the computer program for determining a flesh color detection condition from the storage medium 8, and pass the computer program to the control unit 6.

The storage unit 5 includes, for example, a readable and writable non-volatile semiconductor memory, and a readable and writable volatile semiconductor memory. The storage unit 5 stores various kinds of application programs to be executed on the control unit 6, and various kinds of data. Further, the storage unit 5 may store various kinds of data utilized in a flesh color detection condition determining process, and a flesh color detection condition determined by the flesh color detection condition determining process. Furthermore, the storage unit 5 may store a gesture operation correspondence table, by which a gesture represented by a movement of a hand, and an identification code representing an operation in response to the gesture are correlated to each other.

In the embodiment, the range of colors defined by a flesh color detection condition is represented by an upper limit threshold value and a lower limit threshold value of the range of value corresponding to a flesh color with respect to hue, saturation, and value in an HSV color system.

The control unit 6 includes one or a plurality of processors and peripheral circuit thereof. The control unit 6 is connected to each unit of the gesture recognition apparatus 1 via a signal line, and controls the entire gesture recognition apparatus 1. The control unit 6 is an example of the flesh color detection condition determining apparatus, and the control unit 6, for example, determines a flesh color detection condition, utilizing a sample image received from the imaging unit 3 before a gesture recognition process is started. Further, when the gesture recognition process is started, and every time the control unit 6 receives an image from the imaging unit 3, the control unit 6 detects a flesh color region from the image, utilizing the determined flesh color detection condition, so as to detect the user's hand, which is a subject. The control unit 6 recognizes the gesture performed by the user, based on the detection result, and executes a process corresponding to an operation in response to the gesture.

Figure 3:
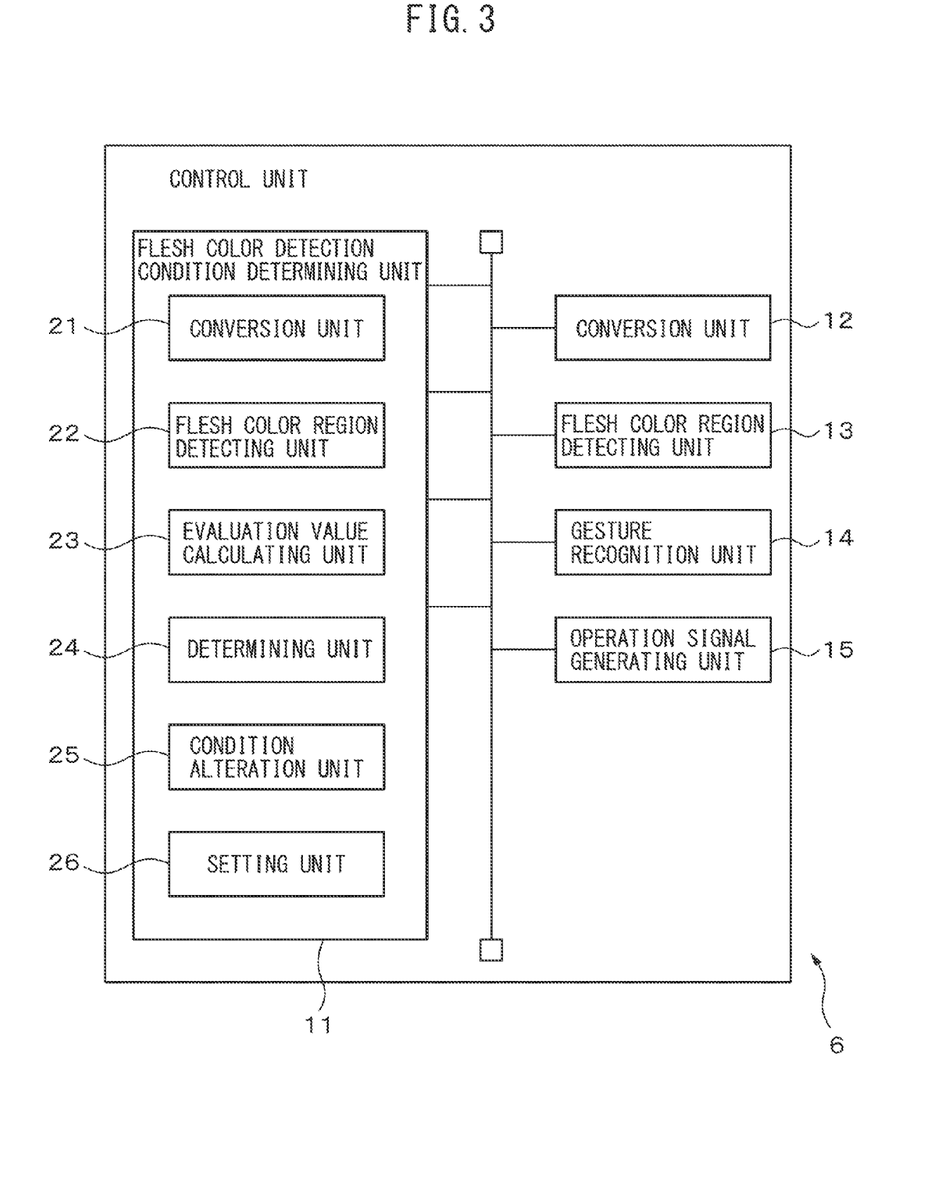
FIG. 3 is a functional block diagram of a control unit.

FIG. 3 is a functional block diagram of the control unit 6. The control unit 6 includes a flesh color detection condition determining unit 11, a conversion unit 12, a flesh color region detecting unit 13, a gesture recognition unit 14, and an operation signal generating unit 15. These units included in the control unit 6 are, for example, incorporated as functional modules that are realized by a computer program executed on the processor included in the control unit 6. Alternatively, these units may be respectively incorporated in the gesture recognition apparatus 1 as individual circuits, separately from the control unit 6, or may be incorporated in the gesture recognition apparatus 1 as an integrated circuit that realizes the functions of these units, separately from the control unit 6.

Among these units included in the control unit 6, the flesh color detection condition determining unit 11 is operated when determining a flesh color detection condition. Further, the conversion unit 12, the flesh color region detecting unit 13, the gesture recognition unit 14, and the operation signal generating unit 15 detect a flesh color region from an image, using the flesh color detection condition determined by the flesh color detection condition determining unit 11, and are operated when recognizing the gesture of the user, based on the detection result.

(Flesh Color Detection Condition Determining Process)

First of all, the flesh color detection condition determining process to be executed by the flesh color detection condition determining unit 11 is described.

As illustrated in FIG. 3, the flesh color detection condition determining unit 11 includes a conversion unit 21, a flesh color region detecting unit 22, an evaluation value calculating unit 23, a determining unit 24, a condition alteration unit 25, and a setting unit 26.

The conversion unit 21 converts the value of each pixel of a sample image obtained from the imaging unit 3 from values represented by an RGB color system to values represented by an HSV color system. In the embodiment, a sample image is an image in which a hand (including the fingers) of a person is represented, and the background other than the hand has colors easily discriminable from the flesh color. A sample image is generated, for example, by photographing a hand placed on a table having a color such as white, black, or blue by the imaging unit 3.

The conversion unit 21 converts the value of each pixel of a sample image according to the following equation (1), for example:

$$V = \mathrm{MAX}(R, G, B) \quad (1)$$
$$S = 255 \times \frac{\mathrm{MAX}(R, G, B) - \mathrm{MIN}(R, G, B)}{\mathrm{MAX}(R, G, B)}$$
$$H = 60 \times \left(\frac{B - G}{\mathrm{MAX}(R, G, B) - \mathrm{MIN}(R, G, B)}\right)(R = \mathrm{MAX}(R, G, B)$$
$$H = 60 \times \left(2 + \frac{R - B}{\mathrm{MAX}(R, G, B) - \mathrm{MIN}(R, G, B)}\right)(G = \mathrm{MAX}(R, G, B)$$
$$H = 60 \times \left(4 + \frac{G - R}{\mathrm{MAX}(R, G, B) - \mathrm{MIN}(R, G, B)}\right)(B = \mathrm{MAX}(R, G, B)$$

where

R, G, B respectively denote a red component, a green component, and a blue component of a pixel before conversion.

MAX, MIN respectively denote a maximum value and a minimum value among a red component, a green component, and a blue component of a pixel before conversion, and H, V, S respectively denote hue, value, and saturation of a pixel after conversion.

When the value of H obtained by the equation (1) is minus, a value obtained by adding 360 to the value becomes a value of hue. In this example, the value V and the saturation S respectively takes values in the range from 0 to 255. Further, the hue H takes values in the range from 0 to 359.

The conversion unit 21 stores a sample image after conversion in the storage unit 5. When the imaging unit 3 generates a color image expressed by an HSV color system, the conversion unit 21 may be omitted.

The flesh color region detecting unit 22 detects a flesh color region from a sample image, using a provisional flesh color detection condition set by the condition alteration unit 25 during search of the flesh color detection condition. However, the flesh color region detecting unit 22 uses an initially set flesh color detection condition for the first-time flesh color region detection.

The initially set flesh color detection condition defines a range of colors wide enough for securely detecting a subject having a flesh color. However, the initially set flesh color detection condition may be wide enough so that a region in which an object having a color close to a flesh color is represented may be detected as a flesh color region. This is because an object having a color close to the flesh color is assumed not to be represented in a sample image. The range of colors defined by the initially set flesh color detection condition is represented by the following equation, for example:

$$0 \le \frac{H}{360} < 0.11 \text{ or } 0.89 < \frac{H}{360} < 1.0 \quad (2)$$
$$0.1 < \frac{V}{255} < 0.22$$
$$0.1 < \frac{S}{255} < 0.8$$

where, H, V, S respectively denotes hue, value, and saturation of a targeted pixel.

The flesh color region detecting unit 22 extracts a pixel of which values of hue H, value V, and saturation S are included in the ranges of hue, value, and saturation defined by a provisional flesh color detection condition as a flesh color pixel having a flesh color among each pixel on a sample image. The flesh color region detecting unit 22 generates a binary image such that the pixel value of an extracted flesh color pixel and the pixel value of a background pixel other than the flesh color pixel are different from each other. In a binary image, the value of a flesh color pixel is represented by 255, for example, and the value of a background pixel is represented by 0, for example.

The flesh color region detecting unit 22 assumes a group of flesh color pixels as a flesh color region in the binary image.

The flesh color region detecting unit 22 may perform a morphological dilation and erosion operation with respect to the flesh color region so as to include a background image of which periphery is surrounded by flesh color pixels in the flesh color region. Hereby, a pixel, which has a color excluded from the flesh color detection condition due to a shadow or the like cast by an influence of a crease of the hand despite the fact that a part of the hand is represented in the pixel, may be included in a flesh color region.

Figure 4A:
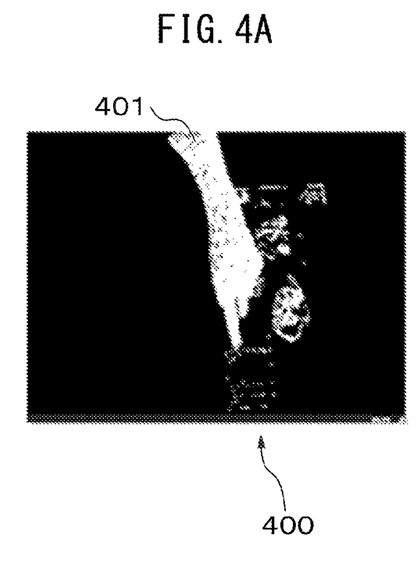
FIG. 4A is a binary image representing a flesh color region detected from a sample image in accordance with an initially set flesh color detection condition.
Figure 4B:
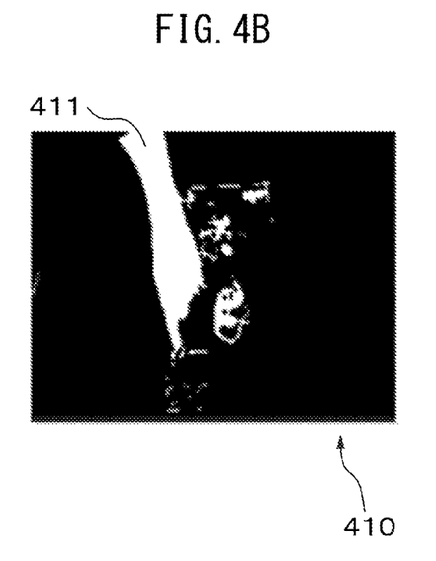
FIG. 4B is a binary image obtained by performing dilation and erosion of the binary image illustrated in FIG. 4A.

FIG. 4A is a binary image representing a flesh color region detected from a sample image in accordance with an initially set flesh color detection condition. FIG. 4B is a binary image obtained by performing dilation and erosion of the flesh color region of the binary image illustrated in FIG. 4A. In FIG. 4A and FIG. 4B, white pixels are flesh color pixels, and black pixels are background pixels. As illustrated in FIG. 4A, in a binary image 400, background pixels reside by being surrounded by a flesh color region 401 even in a part in which a hand is represented. On the other hand, as illustrated in FIG. 4B, it is clear that almost all the part, in which the hand is represented in a binary image 410, is included in a flesh color region 411 by performing dilation and erosion of the flesh color region 401.

The flesh color region detecting unit 22 passes the binary image to the evaluation value calculating unit 23.

The evaluation value calculating unit 23 calculates an evaluation value representing the size of a flesh color region. In the embodiment, a sample image is generated by photographing a hand in a state that there is no object which may be misjudged to have a flesh color in the periphery of the hand. In view of the above, it is most likely that a flesh color region obtained by applying an initially set flesh color detection condition in regard to a sample image accurately represents a region in which the hand is represented.

In view of the above, the evaluation value calculating unit 23 sets an evaluation value calculated, based on a flesh color region detected by applying an initially set flesh color detection condition in regard to a sample image as a reference value representing the size of a subject (a hand including the fingers in the embodiment) on the sample image.

When the gesture of the user is recognized, based on a hand represented on an image, the control unit 6 may not accurately recognize the gesture, if the positions of fingers are not accurately detected. In view of the above, in the embodiment, the evaluation value calculating unit 23 calculates the area of a flesh color region and the average value of tip end position of each finger on a sample image, as a reference value and an evaluation value.

The evaluation value calculating unit 23 counts the number of pixels included in a flesh color region on a binary image received from the flesh color region detecting unit 22, and sets the sum as the area of the flesh color region. Further, the evaluation value calculating unit 23 performs a template matching process between the binary image and a template representing the shape of each finger, and detects a position having a highest degree of matching with the template on the binary image. The evaluation value calculating unit 23 respectively sets the positions on the binary image, corresponding to the tip end position of each finger on the template, which is aligned with the detected position, as the tip end position of each finger. The evaluation value calculating unit 23 may specify the tip end position of each finger by other method for specifying the tip end positions of fingers from an image, for example, a method disclosed in Japanese Laid-open Patent Publication No. 2003-346162.

When the tip end position of each finger is specified, the evaluation value calculating unit 23 calculates the average value of the tip end position of each finger. For example, when the longitudinal direction of the hand goes along a vertical direction of a sample image, the evaluation value calculating unit 23 calculates the average value of vertical coordinate values of pixels at the tip end position of each finger.

The evaluation value calculating unit 23 stores, in the storage unit 5, the area of a flesh color region and the average value of the tip end position of each finger calculated using the initially set flesh color detection condition, as a reference value. Further, the evaluation value calculating unit 23 passes, to the determining unit 24, the area of a flesh color region and the average value of the tip end position of each finger calculated using a provisional flesh color detection condition, as an evaluation value.

The determining unit 24 determines whether or not a difference between the reference value and an evaluation value calculated based on a flesh color region obtained by the second-time flesh color region detection and thereafter is included in a predetermined allowable range. In the embodiment, the determining unit 24 compares the area of the flesh color region and the average value of the tip end position of each finger, as an evaluation value, with a reference value according to the following equations:

$$\frac{A - A'}{A} \times 100 > \alpha \qquad (3)$$

$$(B - B') > \beta \qquad (4)$$

where

A denotes the area of a flesh color region calculated as a reference value,

A' denotes the area of a flesh color region obtained by a latest provisional flesh color detection condition, α denotes the threshold value representing an allowable range of a difference in area, and is set to 3(%) to 5(%), for example, B denotes the average value of tip end position of each finger calculated as a reference value, B' denotes the average value of tip end position of each finger obtained from a flesh color region detected using a latest provisional flesh color detection condition, and β denotes the threshold value representing an allowable range of a difference in tip end position of each finger, and is set to 0, for example.

When either one of the equation (3) and the equation (4) is satisfied with respect to each of the threshold values, for example, the determining unit 24 determines that the difference between the reference value and the evaluation value has exceeded the allowable range. When the difference between the reference value and the evaluation value is determined to have exceeded the allowable range, the determining unit 24 notifies the setting unit 26 to that effect.

On the other hand, when neither one of the equation (3) and the equation (4) is satisfied, i.e., when the difference between the reference value and the evaluation value lies within the allowable range, the determining unit 24 notifies the condition alteration unit 25 to that effect. Further, when there remains a threshold value that has not been changed by the condition alteration unit 25, i.e., when there remains an untargeted threshold value, if either one of the equation (3) and the equation (4) is satisfied, the determining unit 24 notifies the condition alteration unit 25 to that effect.

When the difference between the reference value and the evaluation value lies within the allowable range, the condition alteration unit 25 narrows the range of colors to be detected as a flesh color narrower than the latest provisional flesh color detection condition used in the immediately preceding flesh color region detection. In other words, the condition alteration unit 25 revises at least one of the threshold value representing the respective upper limit or the lower limit of the ranges of hue, value, and saturation defined by the provisional flesh color detection condition used in the immediately preceding flesh color region detection so as to narrow the range of colors to be detected as a flesh color.

The condition alteration unit 25 selects, for example, either one of the aforementioned threshold values as a targeted threshold value in accordance with a predetermined order. The condition alteration unit 25 may change the targeted threshold value until either one of the equation (3) and the equation (4) is satisfied, and thereafter, may select other threshold value and repeat the same process.

The condition alteration unit 25 may select a corresponding threshold value in such an order that the distribution of hue, value, and saturation of flesh color pixels on a sample image, which is included in a flesh color region, becomes sparse. For example, the condition alteration unit 25 may select a threshold value in the order of the lower limit threshold value of value, the upper limit threshold value of saturation, the upper limit threshold value of value, the lower limit threshold value of saturation, the lower limit threshold value of hue, and the upper limit threshold value of hue.

Further, the condition alteration unit 25 may perform a principal component analysis with regard to a distribution of hue, value, and saturation of pixels on a sample image, which is included in a flesh color region, and may specify the order by which the distribution becomes sparse with respect to the respective upper limit and the lower limit of hue, value, and saturation.

In a region where the distribution of flesh color pixels is sparse, an influence on the distribution of flesh color pixels by changing the threshold value is small. In view of the above, an influence on a change in area of a flesh color region and on a change in tip end positions of fingers by changing the threshold value is also small. Therefore, the condition alteration unit 25 can appropriately narrow down the range of hue or the like by changing in order from the threshold value in response to a region where the distribution of flesh color pixels is sparse, without obtaining a range of colors to be detected as a flesh color by changing the order of a threshold value selection in various ways.

Figure 5:
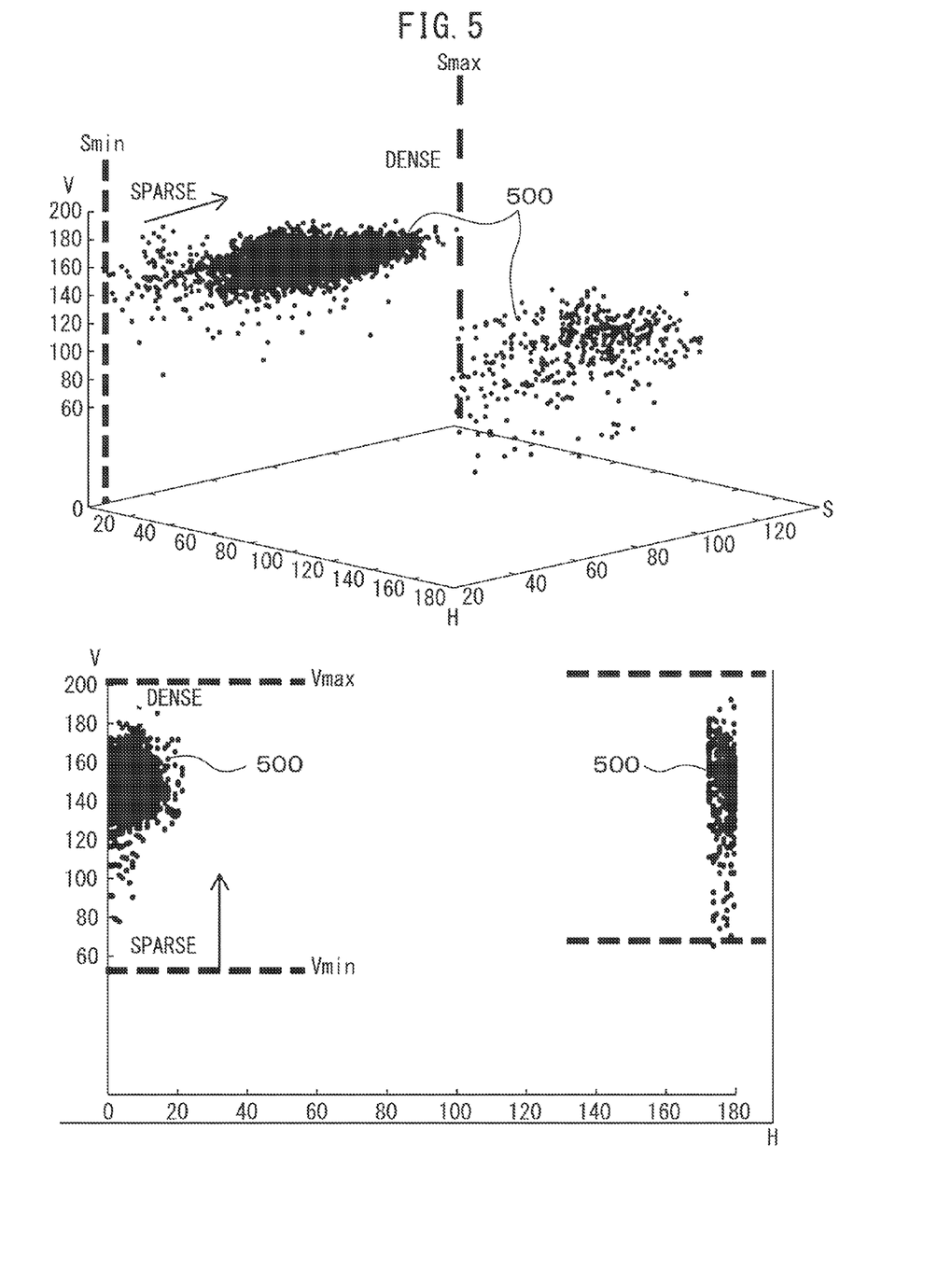
FIG. 5 is a diagram illustrating an example of a distribution of flesh color pixels.

FIG. 5 is a diagram illustrating an example of a distribution of flesh color pixels included in a flesh color region. In FIG. 5, an axis denoted by H represents hue, an axis denoted by V represents value, and an axis denoted by S represents saturation. Each individual point included in a distribution 500 respectively represents hue, value, and saturation of one flesh color pixel. Vmax, Vmin respectively denote an upper limit threshold value and a lower limit threshold value of the range of value for use in detecting as a flesh color pixel. Likewise, Smax, Smin respectively denote an upper limit threshold value and a lower limit threshold value of the range of saturation for use in detecting as a flesh color pixel.

In this example, the distribution of flesh color pixels is sparse on the lower limit side, as compared with the upper limit side, in any of value and saturation. In view of the above, it is preferable for the condition alteration unit 25 to raise the lower limit threshold value Vmin of value, rather than to lower the upper limit threshold value Vmax of value. Likewise, it is preferable for the condition alteration unit 25 to raise the lower limit threshold value Smin of saturation, rather than to lower the upper limit threshold value Smax of saturation. Further, the distribution of flesh color pixels is sparse in the vicinity of the lower limit of value, as compared with the vicinity of the lower limit of saturation, so it is preferable for the condition alteration unit 25 to raise the lower limit threshold value Vmin of value, rather than to raise the lower limit threshold value Smin of saturation.

The condition alteration unit 25 may select either one of the aforementioned threshold values at random. The condition alteration unit 25 may repeat selecting and changing the threshold value until either one of the equation (3) and the equation (4) is satisfied with respect to all the threshold values.

The condition alteration unit 25 revises the selected threshold value by a predetermined amount so as to narrow the ranges of hue, value, and saturation to be detected as a flesh color pixel. The predetermined amount may be set, for example, to a value corresponding to a predetermined ratio (e.g. 1% to 3%) of the ranges in response to the threshold value, among the ranges of hue, value, and saturation, or may be set to a predetermined value (e.g. 1 to 5), for example.

The condition alteration unit 25 stores the provisional flesh color detection condition after the alteration in the storage unit 5, and notifies the flesh color region detecting unit 22 of the provisional flesh color detection condition after the alteration.

When the difference between the reference value and the evaluation value exceeds the allowable range, the setting unit 26 sets a provisional flesh color detection condition that minimizes the range of colors to be detected as a flesh color, among the provisional flesh color detection conditions obtained by that time, as the flesh color detection condition utilized in a gesture recognition process.

As described above, the condition alteration unit 25 selects the upper limit threshold value or the lower limit threshold value of hue, value, and saturation in a predetermined order, one by one, changes the threshold value until the equation (3) or the equation (4) is satisfied with respect to the selected threshold value, and thereafter selects other threshold value and repeats the same process. In this case, the setting unit 26 sets a value immediately before the equation (3) or the equation (4) is satisfied, as the threshold value, with respect to each of the threshold values. Hereby, when all the threshold values are obtained, the range of colors defined by the obtained each of threshold values serves as a smallest range of colors to be detected as a flesh color, among the provisional flesh color detection conditions obtained by then. Therefore, the setting unit 26 sets the range of colors defined by the threshold values, as a flesh color detection condition.

Figure 6:
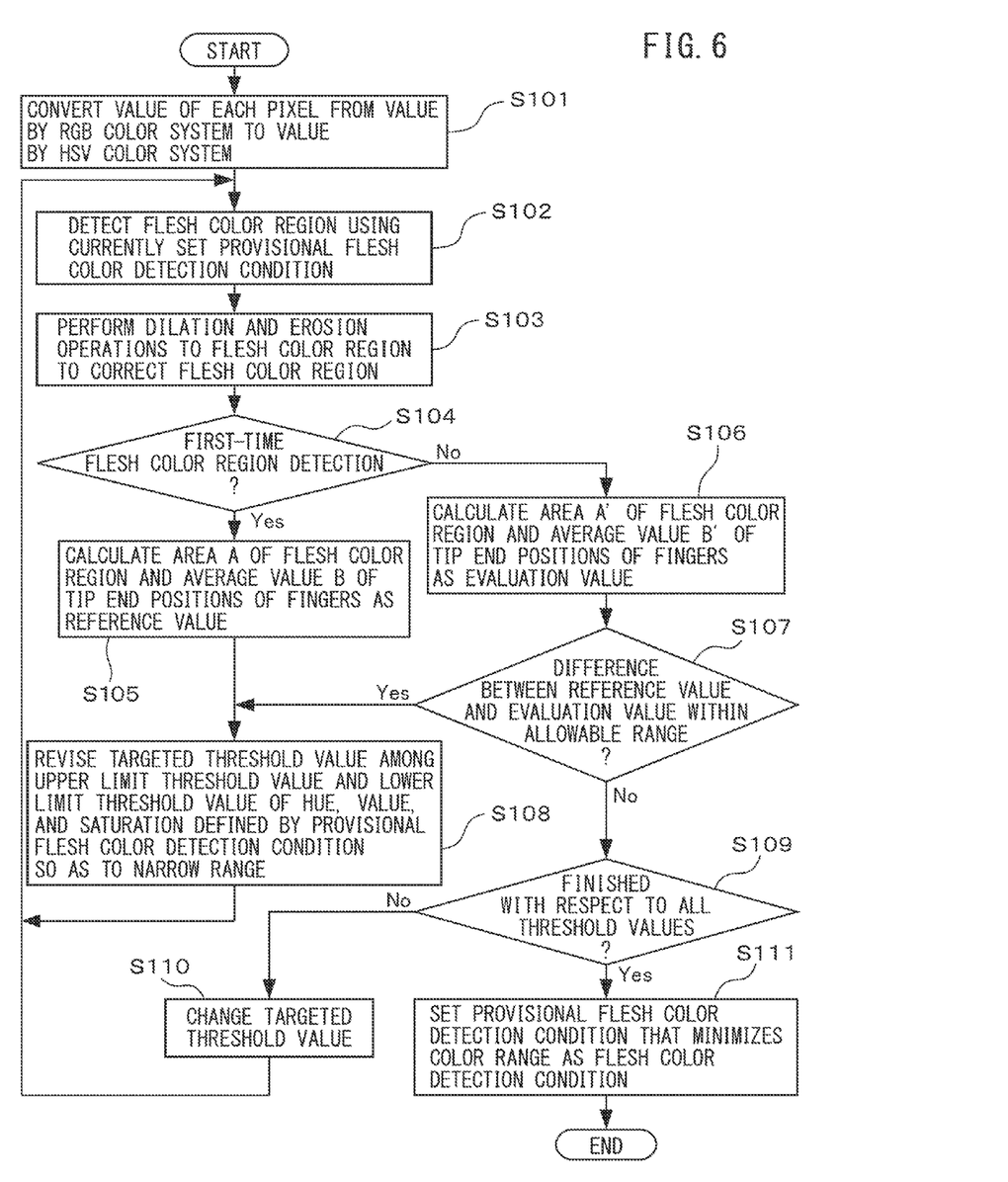
FIG. 6 is an operation flowchart of a flesh color detection condition determining process.

FIG. 6 is an operation flowchart of the flesh color detection condition determining process to be executed by the flesh color detection condition determining unit 11. The conversion unit 21 converts the value of each pixel of a sample image from values represented by an RGB color system to values represented by an HSV color system (step S101). Then, the conversion unit 21 stores the sample image after the conversion in the storage unit 5.

The flesh color region detecting unit 22 detects a flesh color region from the sample image of which value of each pixel is represented by an HSV color system, using the currently set provisional flesh color detection condition (step S102). In the first-time flesh color region detection, the flesh color region detecting unit 22 uses the initially set flesh color detection condition. Then, the flesh color region detecting unit 22 performs dilation and erosion of the detected flesh color region in order to correct the flesh color region (step S103).

The flesh color detection condition determining unit 11 determines whether or not the flesh color region detection executed in step S102 is the first-time flesh color region detection which uses the initially set flesh color detection condition (step S104). When the flesh color region detection is the first-time flesh color region detection (Yes in step S104), the evaluation value calculating unit 23 calculates the area A of the flesh color region, and the average value B of the tip end positions of fingers, as a reference value (step S105).

On the other hand, when the flesh color region detection is not the first-time flesh color region detection in step S104 (No in step S104), the evaluation value calculating unit 23 calculates the area A' of the flesh color region, and the average value B' of the tip end positions of fingers, as an evaluation value (step S106). Then, the determining unit 24 compares the area A' with the reference value A of the area, and compares the average value B' of the tip end positions of fingers, with the reference value B of the average value of the tip end positions of fingers in order to determine whether or not the difference between the reference value and the evaluation value lies within the allowable range (step S107).

After step S105, or when the difference between the reference value and the evaluation value lies within the allowable range in step S107 (Yes in step S107), it is possible to narrow the range of colors to be detected as a flesh color. Therefore, the condition alteration unit 25 revises a targeted threshold value among the upper limit threshold value and the lower limit threshold value of the ranges of hue, value, and saturation, which are defined by a provisional flesh color detection condition so as to narrow the range of colors (step S108). Then, the flesh color detection condition determining unit 11 repeats the process of Step S102 and thereafter.

On the other hand, when the difference between the reference value and the evaluation value exceeds the allowable range in step S107 (No in step S107), the condition alteration unit 25 determines whether or not the process from step S102 to step S108 is finished with respect to all the threshold values (step S109). When there remains an untargeted threshold value (No in step S109), the condition alteration unit 25 changes the targeted threshold value (step S110). Then, the flesh color detection condition determining unit 11 repeats the process of step S102 and thereafter.

On the other hand, when the process from step S102 to step S108 is finished with respect to all of the threshold values (Yes in step S109), no untargeted threshold value remains. Therefore, the setting unit 26 specifies a provisional flesh color detection condition that minimizes the range of colors to be detected as a flesh color, among such provisional flesh color detection conditions set by then, that the difference between the reference value and the evaluation value lies within the allowable range. Then, the setting unit 26 sets the specified provisional flesh color detection condition as a flesh color detection condition utilized in a gesture recognition process (step S111). Then, the flesh color detection condition determining unit 11 finishes the flesh color detection condition determining process.

(Gesture Recognition Process)

Next, a gesture recognition process, utilizing the flesh color detection condition determined by the flesh color detection condition determining unit 11 is described.

Every time an image is obtained from the imaging unit 3, the conversion unit 12 converts the value of each pixel of the image from values by an RGB color system to values by an HSV color system. In view of the above, the conversion unit 12 may convert the value of each pixel according to the equation (1). Then, the conversion unit 12 passes, to the flesh color region detecting unit 13, an image of which value of each pixel is converted to the value by the HSV color system. When the imaging unit 3 generates a color image of which value of each pixel is represented by the HSV color system, the conversion unit 12 may be omitted.

Every time an image, of which value of each pixel is represented by an HSV color system, is received from the conversion unit 12, the flesh color region detecting unit 13 applies a flesh color detection condition determined by the flesh color detection condition determining unit 11 to the image, and detects a flesh color region.

In view of the above, the flesh color region detecting unit 13 may execute the same process as the flesh color region detecting unit 22 of the flesh color detection condition determining unit 11. Namely, the flesh color region detecting unit 13 may extract, as a flesh color pixel, each pixel on the image which has such values of hue H, value V and saturation S that are included within the ranges of hue, value, and saturation designated by the flesh color detection condition. Then, the flesh color region detecting unit 13 generates a binary image in which the pixel value of the flesh color pixel and the pixel value of the background pixel are different from each other and a group of flesh color pixels represents a flesh color region and passes the binary image to the gesture recognition unit 14.

The gesture recognition unit 14 recognizes the gesture of the user based on the binary image, every time the binary image representing the flesh color region is obtained. For example, the gesture recognition unit 14 specifies the tip end positions of the fingers of the user, from the flesh color region. In that case, the gesture recognition unit 14 may, for example, execute the same process as the process of detecting the tip end positions of the fingers by the evaluation value calculating unit 23 of the flesh color detection condition determining unit 11 in order to specify the tip end positions of the fingers. Then, the gesture recognition unit 14 tracks the tip end positions of the fingers over a plurality of images, and obtains a moving direction vector, representing a moving direction of the fingers.

When the horizontal component of a moving direction vector is larger than the vertical component thereof, and the moving direction vector is directed leftward, the gesture recognition unit 14 determines that the user has performed a gesture of moving his or her hand leftward. Likewise, when the horizontal component of a moving direction vector is larger than the vertical component thereof, and the moving direction vector is directed rightward, the gesture recognition unit 14 determines that the user has performed a gesture of moving his or her hand rightward.

Further, when the vertical component of a moving direction vector is larger than the horizontal component thereof, and the moving direction vector is directed upward, the gesture recognition unit 14 determines that the user has performed a gesture of moving his or her hand upward. Likewise, when the vertical component of a moving direction vector is larger than the horizontal component thereof, and the moving direction vector is directed downward, the gesture recognition unit 14 determines that the user has performed a gesture of moving his or her hand downward. The gesture recognition unit 14 notifies the operation signal generating unit 15 of the moving direction of the hand as a gesture.

According to a modified example, the gesture recognition unit 14 may recognize a combination of a moving direction of the user's hand and a moving amount of the user's hand per imaging cycle of the imaging unit 3, as a gesture performed by the user.

The operation signal generating unit 15 generates an operation signal corresponding to a gesture performed by the user, which is specified by the gesture recognition unit 14. For example, the operation signal generating unit 15 refers to a gesture operation correspondence table, which is stored in the storage unit 5 and represents a correspondence between a gesture and an operation to be performed, and generates an operation signal corresponding to the gesture.

Figure 7:
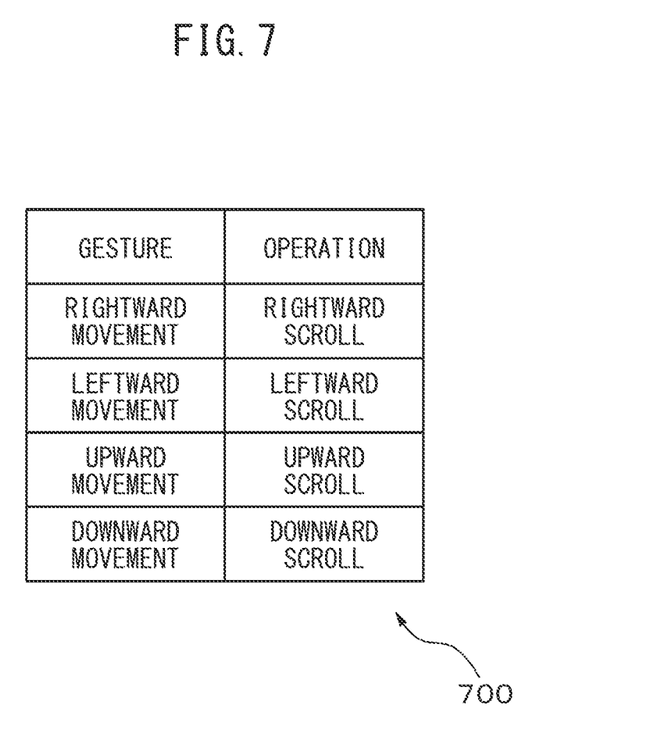
FIG. 7 is a diagram illustrating an example of a gesture operation correspondence table.

FIG. 7 is a diagram illustrating an example of the gesture operation correspondence table, when a window is scrollable in an application in operation in the gesture recognition apparatus 1. In a gesture operation correspondence table 700, a gesture is illustrated in each column of a left row, and an operation, corresponding to a gesture illustrated in the column adjacent on the left side of the column, is illustrated in each column of a right row. For example, when the gesture is moving the hand rightward, the operation signal generating unit 15 generates an operation signal of scrolling the displaying window rightward, referring to the gesture operation correspondence table 700. Further, when the gesture is moving the hand upward, the operation signal generating unit 15 generates an operation signal of scrolling the displaying window upward, referring to the gesture operation correspondence table 700.

An operation corresponding to a gesture is not limited to a scrolling of a window. For example, when a plurality of icons are displayed in a two-dimensional array on a display screen of the display unit 2, a movement of the hand to each direction may correspond to an operation of shifting the selected icon along the direction.

Further, when the gesture is recognized, based on a moving direction and a moving amount, the operation signal generating unit 15 may specify an operation corresponding to a combination of the moving direction and the moving amount. For example, when the hand is moved downward, and the moving amount is smaller than a predetermined threshold value, the operation signal generating unit 15 generates an operation signal of scrolling the window downward as well as the aforementioned embodiment. On the other hand, when the hand is moved downward, and the moving amount is equal to or larger than the threshold value, the operation signal generating unit 15 may generate an operation signal of finishing the application in operation.

The operation signal generating unit 15 passes the generated operation signal to the control unit 6. Then, the control unit 6 executes a process corresponding to the operation signal.

As described above, the flesh color detection condition determining apparatus according to the embodiment sets a smallest range of colors, among the range of colors in which the difference between a reference value representing the size of a subject having a flesh color on an image, and an evaluation value representing the size of a flesh color region is included within an allowable range, as a flesh color detection condition. In view of the above, the flesh color detection condition determining apparatus can set an appropriate flesh color detection condition capable of accurately detecting from an image a region in which a subject having a flesh color is represented. The gesture recognition apparatus in which the flesh color detection condition determining apparatus is incorporated detects the user's hand from an image, using an appropriate flesh color detection condition, so it is possible to accurately specify the position or the movement or the like of the user's hand. As a result, the gesture recognition apparatus can accurately recognize the gesture performed by the user.

According to a modified example, the flesh color detection condition may be determined, based on a color image expressed by such other color system as an HLS color system, for example, in place of an HSV color system. In this case, the flesh color detection condition may define the ranges of hue, saturation, and luminance to be detected as a flesh color. As well as the aforementioned embodiment, the flesh color detection condition determining unit 11 may narrow the ranges of hue, saturation, and luminance in such a manner that the change amount of the area of a flesh color region detected by the initially set flesh color detection condition, and the change amount of the tip end positions of fingers lie within an allowable range.

According to other modified example, the determining unit 24 may utilize either one of the equation (3) and the equation (4) in determining whether or not the finishing condition for narrowing the flesh color detection condition is satisfied. In this case, the flesh color detection condition determining unit 11 can reduce the computation amount needed to determine the flesh color detection condition more than the aforementioned embodiment.

According to other modified example, the flesh color detection condition determining unit 11 may change the order of a threshold value selection by the condition alteration unit 25, and execute the aforementioned process by each order so as to obtain a flesh color detection condition. The setting unit 26 of the flesh color detection condition determining unit 11 may set a flesh color detection condition which minimizes the range of colors to be detected as a flesh color, among a flesh color detection conditions that are determined by each order of a threshold value selection, as a flesh color detection condition utilized in gesture recognition. In this case, although the computation amount increases, the flesh color detection condition determining unit 11 can determine the flesh color detection condition which minimizes the range of colors to be detected as a flesh color, without depending on the order of a threshold value selection.

Further, a computer which realizes the function of the flesh color detection condition determining unit 11 may be independent of the gesture recognition apparatus. In this case, the gesture recognition apparatus may store in advance a flesh color detection condition determined by a computer which realizes the function of the flesh color detection condition determining unit 11. Furthermore, the flesh color detection condition determining process according to each of the aforementioned embodiments or the modified examples thereof may be utilized for a purpose other than gesture recognition. In addition, a subject having a flesh color is not limited to a hand including the fingers, but may be a human face. Further, the evaluation value and the reference value may be the area of a flesh color region, or a vertical length or a horizontal length of the flesh color region.

A computer program for causing a computer to realize each function with respect to the flesh color detection condition determining process according to each of the aforementioned embodiments or the modified examples thereof may be provided in a form recorded in a computer-readable medium such as a magnetic recording medium or an optical recording medium. However, a carrier wave is not included in the computer-readable medium.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A flesh color detection condition determining apparatus, comprising:
a processor configured to:
detect, from an image on which a subject having a flesh color is represented, a group of pixels having colors included in a range of colors corresponding to the flesh color, as a flesh color region;
calculate an evaluation value representing a size of the flesh color region;
narrow the range of colors until a difference between the evaluation value and a reference value representing a size of the subject on the image is included in a predetermined allowable range; and
set a narrowest range of colors as a flesh color detection condition, among a range of colors satisfying that the difference is included in the predetermined allowable range, wherein
the subject includes a finger of a human, and
the calculating the evaluation value calculates an average value of a tip end position of the finger on the image.

2. The flesh color detection condition determining apparatus according to claim 1, wherein
a color of each pixel of the image is represented by a combination of hue, value, and saturation,
the range of colors is defined by an upper limit threshold value and a lower limit threshold value of each of ranges of the hue, the value, and the saturation corresponding to a flesh color, and
the narrowing the range of colors selects a threshold value from among the upper limit threshold value and the lower limit threshold value of each of the hue, the value, and the saturation in such an order that a distribution of pixels included in the flesh color region changes from sparse to dense, and changes the selected threshold value until the difference is not included in the predetermined allowable range so as to narrow the range of colors.

3. The flesh color detection condition determining apparatus according to claim 2, wherein
the narrowing the range of colors performs a principal component analysis to the distribution of pixels included in the flesh color region so as to obtain the order of decreasing the distribution of pixels.

4. A flesh color detection condition determining method, comprising:
detecting, by a processor, from an image on which a subject having a flesh color is represented, a group of pixels having colors included in a range of colors corresponding to the flesh color, as a flesh color region;
calculating, by the processor, an evaluation value representing a size of the flesh color region;
narrowing, by the processor, the range of colors until a difference between the evaluation value and a reference value representing a size of the subject on the image is included in a predetermined allowable range; and
setting, by the processor, a narrowest range of colors as a flesh color detection condition, among a range of colors satisfying that the difference is included in the predetermined allowable range, wherein
the subject includes a finger of a human, and
the calculating the evaluation value calculates an average value of a tip end position of the finger on the image.

5. The flesh color detection condition determining method according to claim 4, wherein
a color of each pixel of the image is represented by a combination of hue, value, and saturation,
the range of colors is defined by an upper limit threshold value and a lower limit threshold value of each of ranges of the hue, the value, and the saturation corresponding to a flesh color, and
the narrowing the range of colors selects a threshold value from among the upper limit threshold value and the lower limit threshold value of each of the hue, the value, and the saturation in such an order that a distribution of pixels included in the flesh color region changes from sparse to dense, and changes the selected threshold value until the difference is not included in the predetermined allowable range so as to narrow the range of colors.

6. The flesh color detection condition determining method according to claim 5, wherein
the narrowing the range of colors performs a principal component analysis to the distribution of pixels included in the flesh color region so as to obtain the order of decreasing the distribution of pixels.

7. A non-transitory computer-readable recording medium having recorded thereon a computer program for determining a flesh color detection condition, that causes a computer to execute a process comprising:
detecting, from an image on which a subject having a flesh color is represented, a group of pixels having colors included in a range of colors corresponding to the flesh color, as a flesh color region;
calculating an evaluation value representing a size of the flesh color region;
narrowing the range of colors until a difference between the evaluation value and a reference value representing a size of the subject on the image is included in a predetermined allowable range; and
setting a narrowest range of colors as a flesh color detection condition, among a range of colors satisfying that the difference is included in the predetermined allowable range, wherein
the subject includes a finger of a human, and
the calculating the evaluation value calculates an average value of a tip end position of the finger on the image.

* * * * *